United States Patent
Daniels et al.

(10) Patent No.: US 10,267,654 B2
(45) Date of Patent: Apr. 23, 2019

(54) LVDT HAVING A FLEXIBLE ELEMENT AND A BOBBIN MADE OF THERMOPLASTIC MATERIAL

(71) Applicant: Honeywell International Inc., Morris Plains, NJ (US)

(72) Inventors: Aaron Daniels, Morris Plains, NJ (US); Paresh Sanchihar, Karnataka (IN); Murgesh R Sajjan, Karnataka (IN); Vijayshekhar Araganji, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 69 days.

(21) Appl. No.: 15/357,639

(22) Filed: Nov. 21, 2016

(65) Prior Publication Data
US 2018/0143038 A1    May 24, 2018

(51) Int. Cl.
*G01D 5/22*    (2006.01)

(52) U.S. Cl.
CPC .................. *G01D 5/2291* (2013.01)

(58) Field of Classification Search
CPC .................................................. G01D 5/2291
See application file for complete search history.

(56) References Cited

U.S. PATENT DOCUMENTS

| | | | | |
|---|---|---|---|---|
| 4,490,913 A * | 1/1985 | Vis | ......... | G01B 3/008 33/558 |
| 4,808,958 A * | 2/1989 | Hewitt | ................. | G01D 5/2291 336/136 |
| 6,054,649 A * | 4/2000 | Uchida | .................. | H01B 11/16 174/36 |
| 6,577,133 B1 * | 6/2003 | Barron | ...................... | B60T 8/36 324/207.16 |
| 2005/0062573 A1 * | 3/2005 | Nicholson | ............ | G01D 5/2291 336/126 |
| 2008/0021490 A1 * | 1/2008 | Briggs | ............. | A61B 5/150022 606/181 |

* cited by examiner

*Primary Examiner* — Jay Patidar
(74) *Attorney, Agent, or Firm* — Craige Thompson; Thompson Patent Law (57) ABSTRACT

Apparatus and associated methods relate to a linear variable differential transformer (LVDT) having at least one a flexible element attached to a bobbin, where the bobbin is made from thermoplastic material having a coefficient of thermal expansion (CTE) matched to a coil wire of the LVDT. In an illustrative example, the flexible element may include a flexible substrate located between the bobbin and an enclosure of the LVDT. The flexible element provides temperature compensation by absorbing mechanical stresses and/or electro-thermal stresses for the LVDT, while the thermoplastic bobbin provides thermal stability to the LVDT by mitigating breakage of the LVDT coils due to expansion of the bobbin in response to temperature variations.

15 Claims, 7 Drawing Sheets

LVDT HAVING A FLEXIBLE ELEMENT AND A BOBBIN MADE OF THERMOPLASTIC MATERIAL

CROSS-REFERENCE TO RELATED APPLICATIONS

This application claims priority to India Provisional Patent Application Serial No. 3840/DEL/2015 entitled "Thermal Compensating, High Efficiency, Durable, Low Weight, Compact, Scaleable Linear Variable Differential Transformer", filed Nov. 25, 2015 in the India Patent Office.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Linear Variable Differential Transformers (LVDTs) may be used in flight control stabilization in helicopters. An LVDT may be operable to control the pitch on the blades of the helicopter to compensate for winds during flight. The LVDT may be used inside an actuator to accurately measure the movement and position of the different elements used in stabilization.

SUMMARY

In some embodiments, a linear variable differential transformer (LVDT) may comprise a bobbin; one or more coils formed about the bobbin comprising magnet wire; a ferromagnetic core operable to fit within an opening in the bobbin, and operable to move with respect to the bobbin; an enclosure operable to fit around the bobbin, wherein the enclosure functions as a magnetic return path for the LVDT; one or more lead wires located between the enclosure and at least one coil; one or more flexible element attached to the bobbin operable to provide temperature compensation for the LVDT by absorbing mechanical stresses.

In some embodiments, a LVDT may comprise a bobbin; one or more coils formed about the bobbin comprising magnet wire; a ferromagnetic core operable to fit within an opening in the bobbin, and operable to move with respect to the bobbin; an enclosure operable to fit around the bobbin; one or more lead wires located between the enclosure and at least one coil; one or more compensation element operable to provide thermal offset compensation, wherein the compensation element comprises one or more of a spring element, a secondary bobbin, and a high CTE part.

In some embodiments, a bobbin for use in a LVDT may comprise a thermoplastic material integrated with materials comprising a CTE matched to the CTE of wire that form one or more coils about the bobbin; a plurality of washers extending from the bobbin operable to separate the coils; a flexible element operable to provide temperature compensation by absorbing stresses on the bobbin; and one or more strain relief elements extending from the bobbin, wherein a ferromagnetic core may fit through an opening in the bobbin.

In some embodiments, a method for operating a LVDT may comprise attaching a ferromagnetic core to one or more rods; assembling the ferromagnetic core within an opening of a bobbin; forming one or more coils about the bobbin; providing an enclosure operable to fit around the bobbin, wherein the enclosure functions as a magnetic return path for the LVDT; moving the ferromagnetic core with respect to the bobbin, in response to movement of the one or more rods; measuring the movement of the ferromagnetic core by measuring the interaction of the ferromagnetic core with the one or more coils; and absorbing mechanical stresses and/or electro-thermal stresses by a flexible element attached to the bobbin.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include an LVDT for use in an actuator. In some embodiments, the LVDT may be used in actuators in flight control stabilization actuation, for fuel control in aerospace engine valves, active control clearance for pneumatic or hydraulic valves, valves or actuators used in auxiliary power units, door closures, starter air valve controls, variable stator vane actuators, variable bleed valve actuators, transient bleed valve actuators, thrust reversing actuators, brake actuators, landing gear actuators, flap/skew actuators, spoiler/aileron actuators, trim actuators, control of flight services, landing gear locks, level sensing, torque generators, and manifold valve actuation. An LVDT may be operable to control the pitch on the blades of the helicopter to compensate for winds during flight. The LVDT may be used inside an actuator to accurately measure the movement and position of the different elements used in stabilization.

Therefore, the LVDT may need to be small and compact as well as accurate. Because of the constant movement of the elements in an actuator during stabilization, there are concerns for thermal stability for the materials used in an LVDT. Additionally, a LVDT requires complex electrical measurement to achieve accurate displacement measurement, which may be affected by changes in temperature. Typical solutions require a high number of components that must be attached to one another to form the LVDT. Typical solutions may also have a separate magnetic return shield path incorporated into the LVDT. Additionally, mechanical strain on the elements of the LVDT increases conductivity and lowers permeability of the materials.

Embodiments of the disclosure include an LVDT comprising an amalgamation of a plurality of elements to decrease the total number of elements in the LVDT. For example, the LVDT may comprise a bobbin that is formed to incorporate other elements, such as washers, strain relief elements, etc. Additionally, the enclosure may be enabled to function as the return path for the LVDT.

Additionally, the LVDT comprises elements that provide thermal compensation by relieving stresses imposed on the LVDT. For example, the LVDT may comprise a flexible element either attached to or incorporated into the bobbin to compensate for the expansion of the bobbin. In some embodiments, the material of the bobbin may be adjusted to decrease the CTE of the bobbin.

Also, the LVDT may comprise elements that allow for adjusting thermal offset within the LVDT. For example, the LVDT may comprise a spring element, a secondary bobbin, and/or a high CTE element.

Figure 1A:
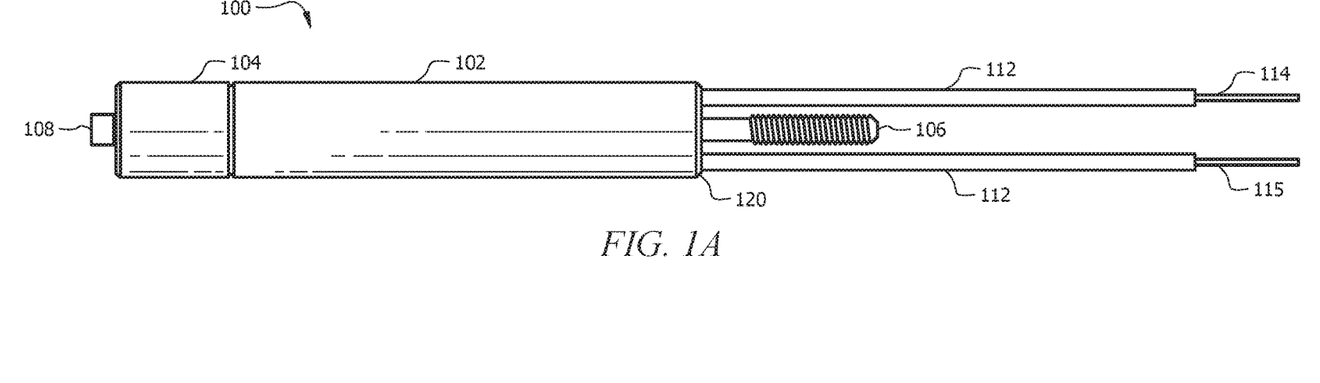
FIGS. 1A-1B illustrate a LVDT according to an embodiment of the disclosure.
Figure 1B:
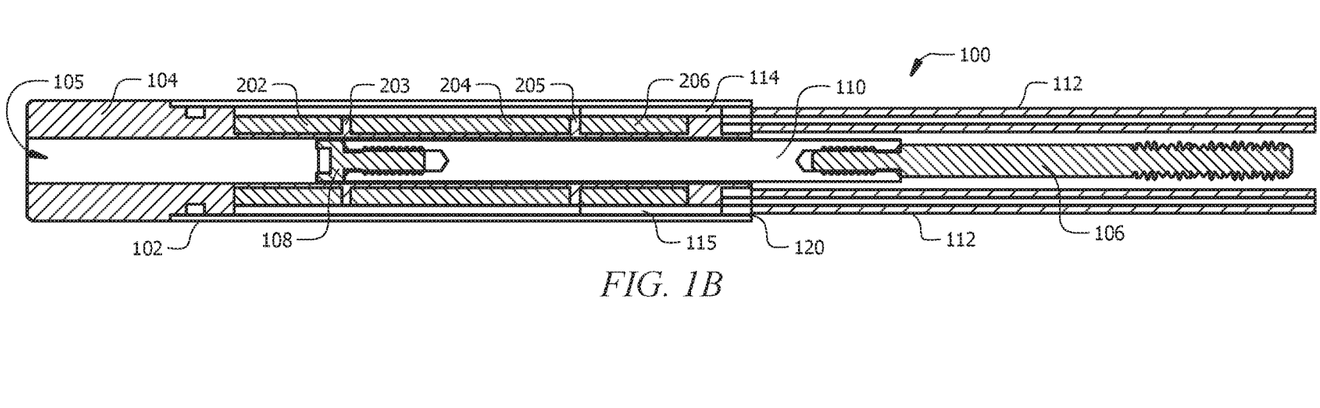

Referring now to FIGS. 1A-1B, an exemplary embodiment of an LVDT 100 is shown. FIG. 1A shows a front view of the LVDT 100, while FIG. 1B shows a cross-sectional view of the LVDT 100. In some embodiments, the LVDT 100 may be used in an actuator to accurately measure position and movement.

The LVDT 100 may comprise a bobbin 104, wherein the bobbin 104 may comprise an opening 105 through the center of the bobbin 104. The LVDT 100 may also comprise an enclosure 102 operable to fit over at least a portion of the bobbin 104. In some embodiments, the LVDT 100 may comprise a ferromagnetic core 110 operable to fit within the opening 105 of the bobbin 104, wherein the core 110 may be operable to move within the opening 105, with respect to the bobbin 104. In some embodiments, the core 110 may be attached to one or more probe rods (or extension rods) 106. In some embodiments, the rod(s) 106 may thread into the core 110. Additionally, the core 110 may be attached to one or more screws 108. In some embodiments, the screw(s) 108 may thread into the core 110. The use of rods 106 and screws 108 may depend on the application or use of the LVDT 100. In some embodiments, the rod 106 could extend from either end of the bobbin 104. In some embodiments, two rods 106 may extend from either end of the core 110. The selection and use of rods(s) 106 and/or screw(s) 108 may depend on orientation and/or compensation thermal offsets. Also, in some embodiments, one end or both ends of the opening 105 in the bobbin 104 may be plugged or sealed. In some embodiments, all or a portion of the LVDT 100 may be sealed for pressurized or unpressurized applications through welding, O-rings, roll forming, or use of adhesives (or any combination of the afore mentioned).

In some embodiments, the LVDT 100 may comprise lead wires 114 and 115 extending from the enclosure 102, wherein the lead wires 114 and 115 may comprise insulation 112. In some embodiments, the bobbin 104 may comprise one or more washers 203 and 205, wherein copper magnet wire may be located between the washers 203 and 205. The wire may be wrapped to form a primary coil 204 and two secondary coils 202 and 206 located about the bobbin 104. In some embodiments, the coils 202, 204, and 206 may be attached to the bobbin 104 and/or the enclosure 102 using an adhesive. In some embodiments, the wire used to form the coils 202, 204, 206 may comprise 43 gauge wire. In some embodiments, the wire used to form the coils 202, 204, 206 may comprise 39 gauge wire. In some embodiments, the coils 202, 204, 206 may comprise a solenoidal coil and/or a variable pitch coil with or without overlap in the coils.

As shown in FIG. 1B, the ends of the lead wires 114 and 115 may be located between the enclosure 102 and the bobbin 104. As the core 110 moves back and forth within the bobbin 104, the voltage on the two secondary coils 202 and 206 may be measured with respect to the primary coil 204 to determine the movement and position of the core 110 within the bobbin 104. In the embodiment shown, the enclosure 102 may function as the magnetic return path for the LVDT 100, wherein no other layers or elements may be required. In some embodiments, the enclosure 102 may be made of stainless steel, which may comprise sufficient permeability to function as the return path. In some embodiments, interior of the enclosure 102 may be plated with a metal, such as nickel. Employing the enclosure 102 as the return path for the LVDT 100 may reduce the number of required elements in the LVDT 100, which may provide a lower cost, reduced manufacturing time, and less dimensional constraints for the LVDT 100. Additionally, using the enclosure 102 as the return path may reduce the weight of the LDVT 100.

In some embodiments, the LDVT 100 may comprise a flexible element attached to the bobbin 104 operable to provide temperature compensation for the LVDT 100 by absorbing mechanical stresses and/or electro-thermal stresses. The flexible element may also offset variation with vibration and movement of the elements of the LVDT 100. Additionally, the flexible element may compensate for mechanical stresses imposed on the LVDT 100 from elements in the actuator that expand in response to increased temperature. The flexible element may allow the elements of the LVDT 100, such as the bobbin 104 and the enclosure 102 to flex or expand without breaking the wires of the coils 202, 204, and 206.

In the embodiment shown in FIGS. 1A-1B, the flexible element may comprise a flexible substrate 120 located between the bobbin 104 and the enclosure 102. In some embodiments, the flexible substrate 120 may comprise any flexible material that may be attached to the other elements. In some embodiments, the flexible substrate 120 may comprise a plastic material. In some embodiments, the flexible substrate 120 may comprise a rubber material. In some embodiments, the lead wires 114 and 115 may pass through the flexible substrate 120. In some embodiments, the flexible substrate 120 may be located at one end of the bobbin 104. In other embodiments, the flexible substrate 120 may be located at the other end of the bobbin 104.

Figure 2:
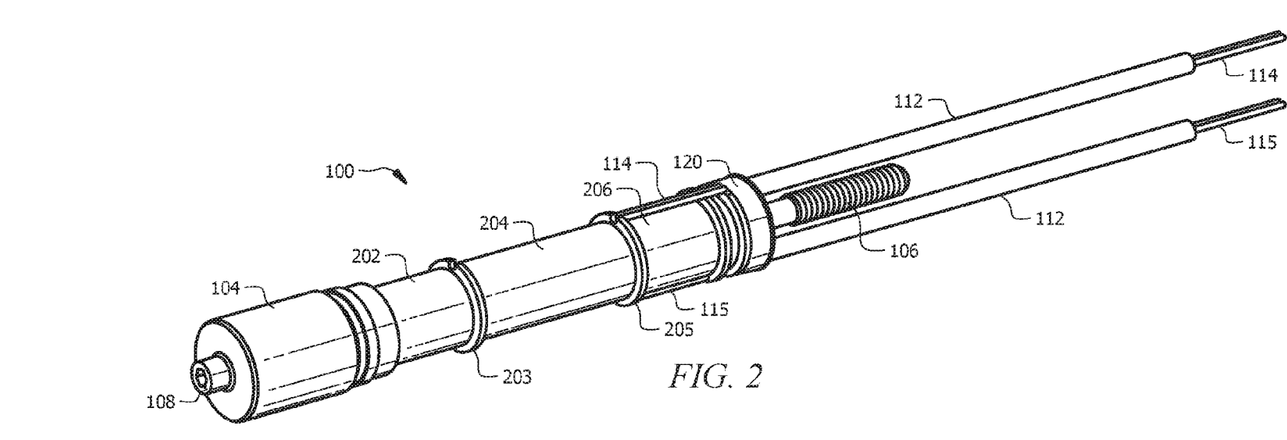
FIG. 2 illustrates a LVDT shown without the enclosure according to an embodiment of the disclosure.

Referring now to FIG. 2, the LVDT 100 is shown with the enclosure 102 (shown above) removed. The elements of the LVDT 100 described above may be seen in more detail in FIG. 2.

Figure 3:
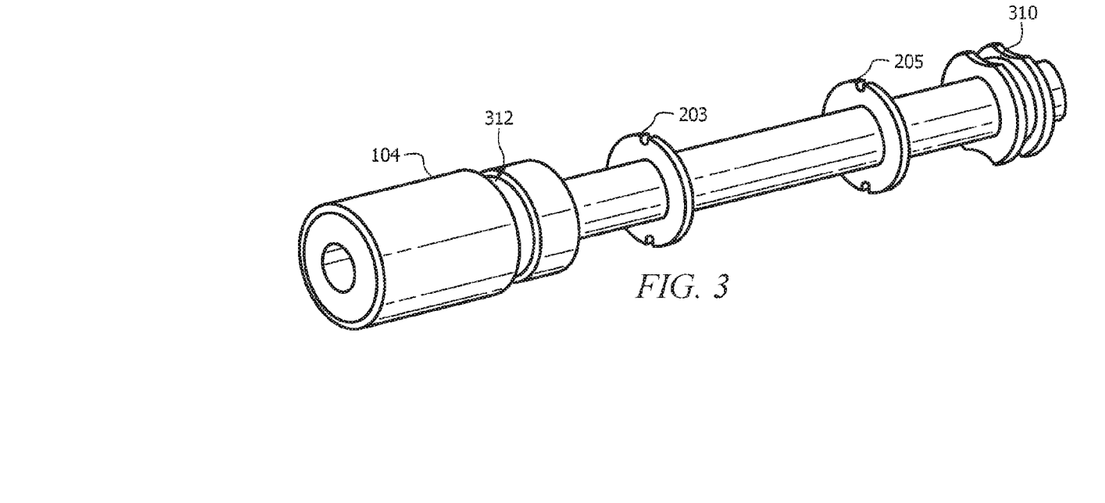
FIG. 3 illustrates a bobbin according to an embodiment of the disclosure.

Referring now to FIG. 3, the bobbin 104 is shown, wherein the bobbin 104 may comprise an amalgamation of a plurality of elements. For example, the washers 203 and 205 may be integrated (or incorporated) into the bobbin 104. In some embodiments, the washers 203 and 205 may comprise a material similar to that of the bobbin 104. In other embodiments, the washers 203 and 205 may comprise a different material than the bobbin 104. Also, one or more strain relief elements 310 may be incorporated into the bobbin 104. In some embodiments, other reliefs or cutouts 312 may be built into the bobbin 104, wherein the reliefs 312 may provide stability for the bobbin 104. In some embodiments, the reliefs or cutouts 312 may provide an attachment point between the enclosure 102 (shown above) and the bobbin 104.

Typically, bobbins used in LVDTs may comprise a metal material for the bobbin, with plastic washers attached to the bobbin. In the embodiment shown in FIG. 3, the bobbin 104 may comprise a thermoplastic material, which may allow for decreased manufacturing costs. However, in other embodiments, a metal bobbin may be used. Typically, plastic materials may comprise a higher CTE than the wire used to form the coils 202, 204, and 206 (not shown), such that when the elements expand due to an increase in temperature, the bobbin expands more than the wire, causing the wire to break. To avoid this issue, the material of the bobbin 104 may be integrated with materials with a CTE matched to the wire, wherein these materials may be operable to provide thermal stability. In some embodiments, the CTE matched materials may comprise glass, carbon, or other materials with similar CTE properties to the wire of the coils 202, 204, and 206 (not shown).

Figure 4A:
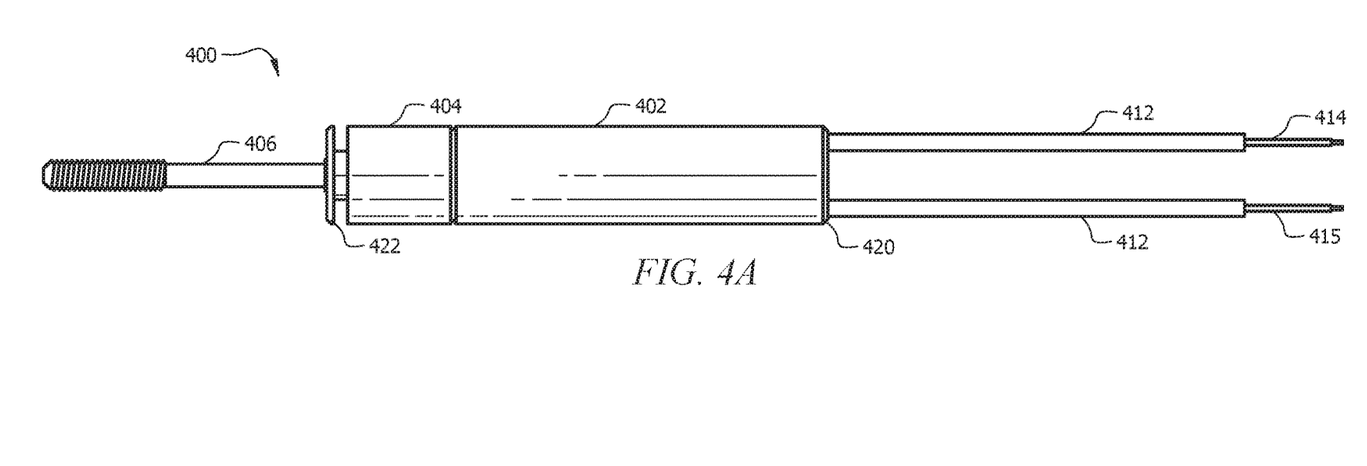
FIGS. 4A-4B illustrate another LVDT according to an embodiment of the disclosure.
Figure 4B:
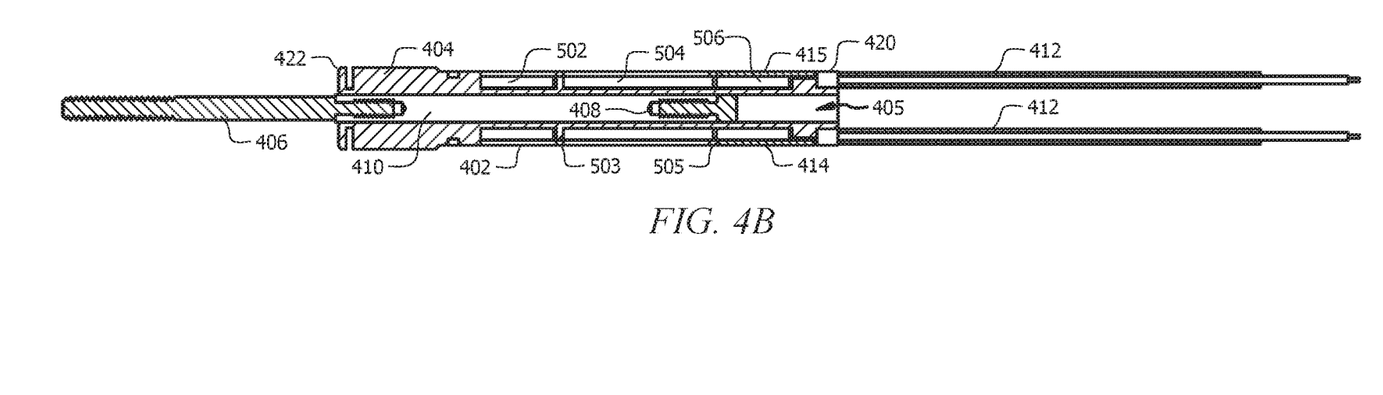

Referring now to FIGS. 4A-4B, another embodiment of an LVDT 400 is shown. FIG. 4A shows a front view of the LVDT 400, while FIG. 4B shows a cross-sectional view of the LVDT 400. In some embodiments, the LVDT 400 may be used in an actuator to accurately measure position and movement. In some embodiments, the LVDT 400 may be similar to the LVDT 100 described in FIGS. 1A, 1B, 2, and 3.

The LVDT 400 may comprise a bobbin 404, wherein the bobbin 404 may comprise an opening 405 through the center of the bobbin 404. The LVDT 400 may also comprise an enclosure 402 operable to fit over at least a portion of the bobbin 404. In some embodiments, the LVDT 400 may comprise a ferromagnetic core 410 operable to fit within the opening 405 of the bobbin 404, wherein the core 410 may be operable to move within the opening 405, with respect to the bobbin 404. In some embodiments, the core 410 may be attached to one or more probe rods (or extension rods) 406. In some embodiments, the rod(s) 406 may thread into the core 410. Additionally, the core 410 may be attached to one or more screws 408. In some embodiments, the screw(s) 408 may thread into the core 410. The use of rods 406 and screws 408 may depend on the application or use of the LVDT 400. In some embodiments, the rod 406 could extend from either end of the bobbin 404. In some embodiments, two rods 406 may extend from either end of the core 410. The selection and use of rods(s) 406 and/or screw(s) 408 may depend on orientation and/or compensation thermal offsets. Also, in some embodiments, one end or both ends of the opening 405 in the bobbin 404 may be plugged or sealed.

In some embodiments, the LVDT 400 may comprise lead wires 414 and 415 extending from the enclosure 402, wherein the lead wires 414 and 415 may comprise insulation 412. In some embodiments, the bobbin 404 may comprise one or more washers 503 and 505, wherein copper magnet wire may be located between the washers 503 and 505. The wire may be wrapped to form a primary coil 504 and two secondary coils 502 and 506 located about the bobbin 404. In some embodiments, the coils 502, 504, and 506 may be attached to the bobbin 404 and/or the enclosure 402 using an adhesive.

As shown in FIG. 4B, the ends of the lead wires 414 and 415 may be located between the enclosure 402 and the bobbin 404. As the core 410 moves back and forth within the bobbin 404, the voltage on the two secondary coils 502 and 506 may be measured with respect to the primary coil 504 to determine the movement and position of the core 410 within the bobbin 404. In the embodiment shown, the enclosure 402 may function as the magnetic return path for the LVDT 400, wherein no other layers or elements may be required. In some embodiments, the enclosure 402 may be made of stainless steel, which may comprise sufficient permeability to function as the return path. In some embodiments, interior of the enclosure 402 may be plated with a metal, such as nickel. Employing the enclosure 402 as the return path for the LVDT 400 may reduce the number of required elements in the LVDT 400, which may provide a lower cost, reduced manufacturing time, and less dimensional constraints for the LVDT 400. Additionally, using the enclosure 402 as the return path may reduce the weight of the LDVT 400.

In some embodiments, the LDVT 400 may comprise a flexible element attached to the bobbin 404 operable to provide temperature compensation for the LVDT 400 by absorbing mechanical stresses and/or electro-thermal stresses. The flexible element may also offset variation with vibration and movement of the elements of the LVDT 400. Additionally, the flexible element may compensate for mechanical stresses imposed on the LVDT 400 from elements in the actuator that expand in response to increased temperature. The flexible element may allow the elements of the LVDT 400, such as the bobbin 404 and the enclosure 402 to flex or expand without breaking the wires of the coils 502, 504, and 506.

In the embodiment shown in FIGS. 4A-4B, the flexible element(s) may comprise a flexible substrate 420 located between the bobbin 404 and the enclosure 402. In some embodiments, the flexible substrate 420 may be similar to the flexible substrate 120 described above. Additionally, the flexible element(s) may comprise a flexure 422 extending from one end of the bobbin 404. The flexure 422 may comprise a disk shaped element formed at one end of the bobbin 404, wherein a portion of the flexure 422 may be operable to bend or flex with respect to the bobbin 404 to absorb stresses on the LVDT 400. For example, the outer edges of the flexure 422 may comprise a high stress concentration, while the center of the flexure 422, at the connection with the bobbin 402, may have a low stress concentration.

Figure 5:
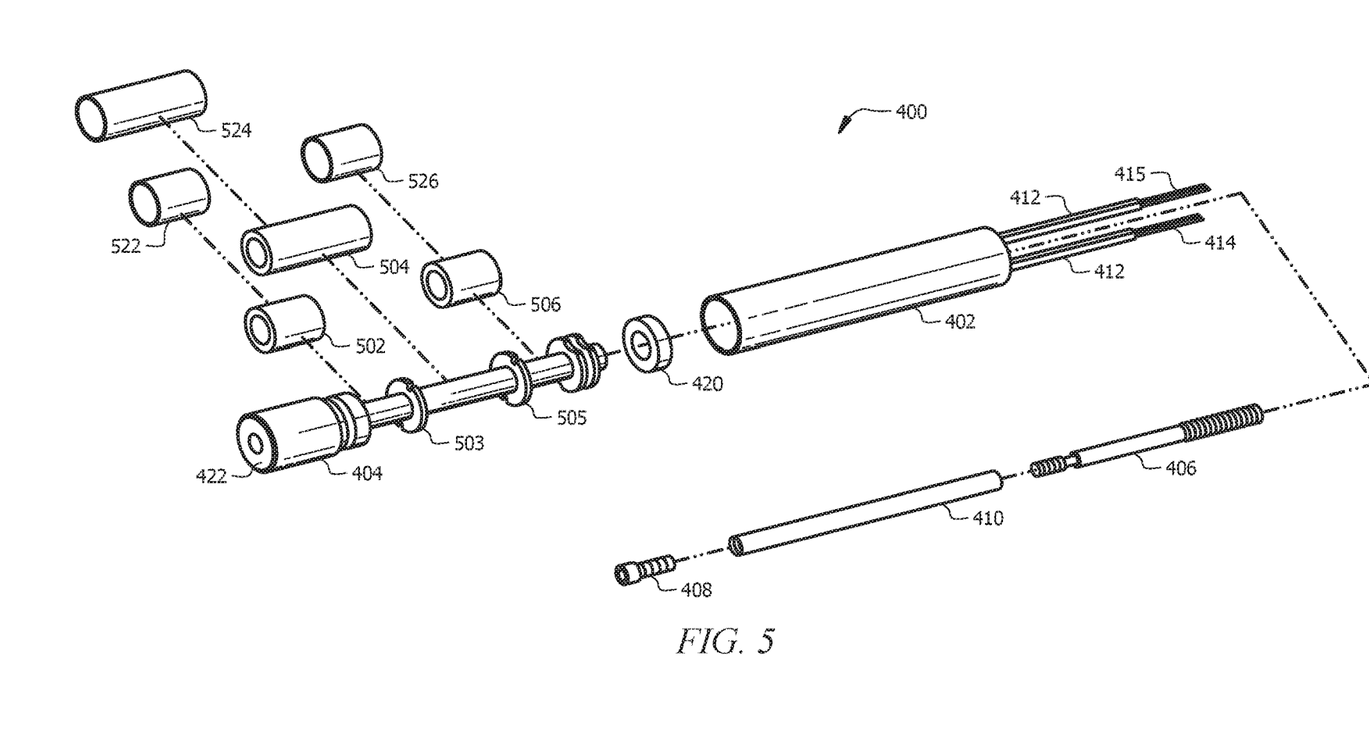
FIG. 5 illustrates an exploded view of a LVDT according to an embodiment of the disclosure.

Referring to FIG. 5, an exploded view of the LVDT 400 is shown. The elements of the LVDT 400 described above may be shown in more detail. In some embodiments, the primary coil 504 and two secondary coils 502 and 506 that are located about the bobbin 404 may be layered with corresponding adhesive 522, 524, and 526. In some embodiments, the adhesive 522, 524, and 526 may comprise a polyester film tape with thermosetting adhesive on at least one surface of the tape. In some embodiments, the adhesive 522, 524, and 526 may be located between the coils 502, 504, and 506 and the bobbin 404. In an alternative embodiment, the adhesive 522, 524, and 526 may be located between the coils 502, 504, and 506 and the enclosure 402. In some embodiments, adhesive may be located on both the bobbin 404 and the enclosure 402.

Figure 6A:
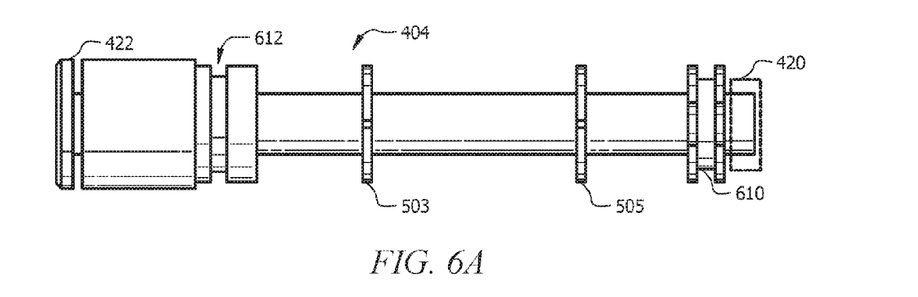
FIGS. 6A-6C illustrate another bobbin according to an embodiment of the disclosure.
Figure 6B:
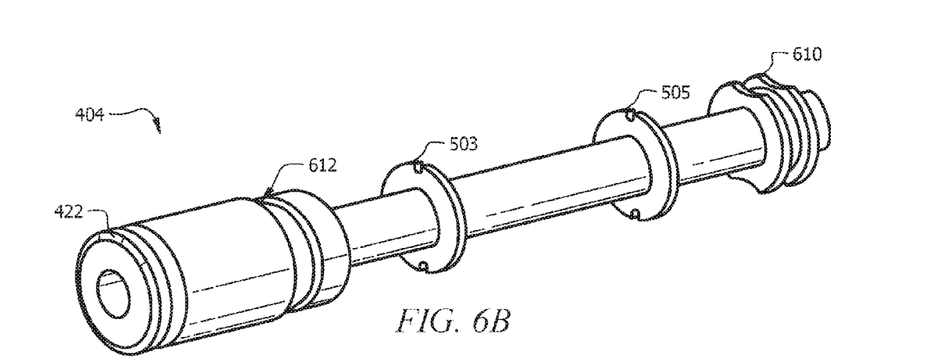
Figure 6C:
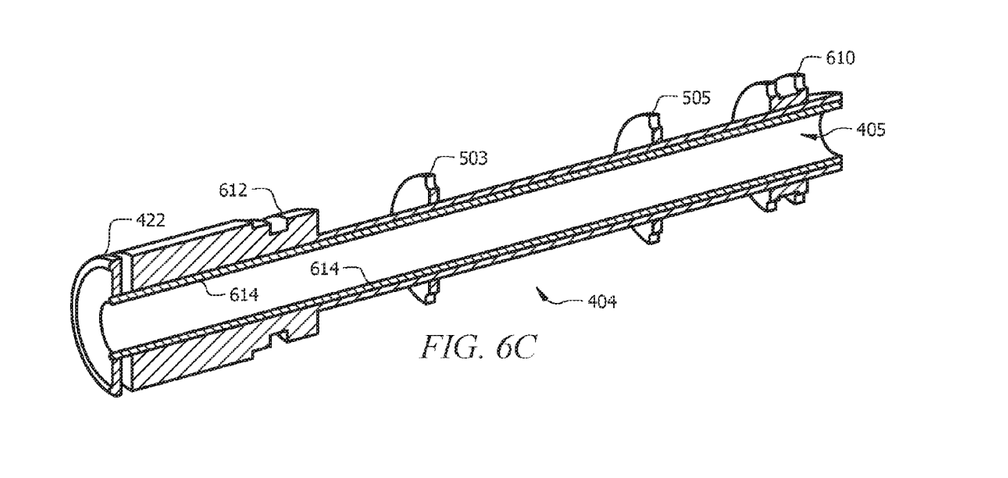

FIGS. 6A-6C shows detailed views of the bobbin 404, wherein the bobbin 404 may comprise an amalgamation of a plurality of elements. For example, the washers 503 and 505 may be integrated (or incorporated) into the bobbin 404. In some embodiments, the washers 203 and 205 may comprise a material similar to that of the bobbin 104. In other embodiments, the washers 203 and 205 may comprise a different material than the bobbin 104. Also, one or more strain relief elements 610 may be incorporated into the bobbin 404. In some embodiments, other reliefs or cutouts 612 may be built into the bobbin 404, wherein the reliefs 612 may provide stability for the bobbin 404. In some embodiments, the reliefs or cutouts 612 may provide an attachment point between the enclosure 402 (shown above) and the bobbin 404.

In the embodiment shown in FIGS. 6A-6C, the bobbin 404 may comprise a thermoplastic material, which may allow for decreased manufacturing costs. However, in other embodiments, a metal bobbin may be used. Typically, plastic materials may comprise a higher CTE than the wire used to form the coils 502, 504, and 506 (not shown), such that when the elements expand due to an increase in temperature, the bobbin expands more than the wire, causing the wire to break. To avoid this issue, the material of the bobbin 404 may be integrated with materials with a CTE matched to the wire, wherein these materials may be operable to provide thermal stability. In some embodiments, the CTE matched materials may comprise glass, carbon, or other materials with similar CTE properties to the wire of the coils 502, 504, and 506.

In some embodiments, the elements built into the bobbin 404 may comprise a flexure 422 (as described above). The flexure 422 may comprise a disk shaped extension, wherein the disk is attached to the main body of the bobbin 404 at the center. The flexure 422 may be operable to flex or bend in response to stresses on the bobbin 404.

As shown in FIG. 6C, in some embodiments, the bobbin 404 may comprise one or more grooves 614 through the opening 405 in the bobbin 404. These grooves 614 may allow the core 410 (not shown) to move quickly back and forth within the opening 405 of the bobbin 404, while avoiding adiabatic and hydraulic piston effects within the bobbin 404.

Figure 7A:
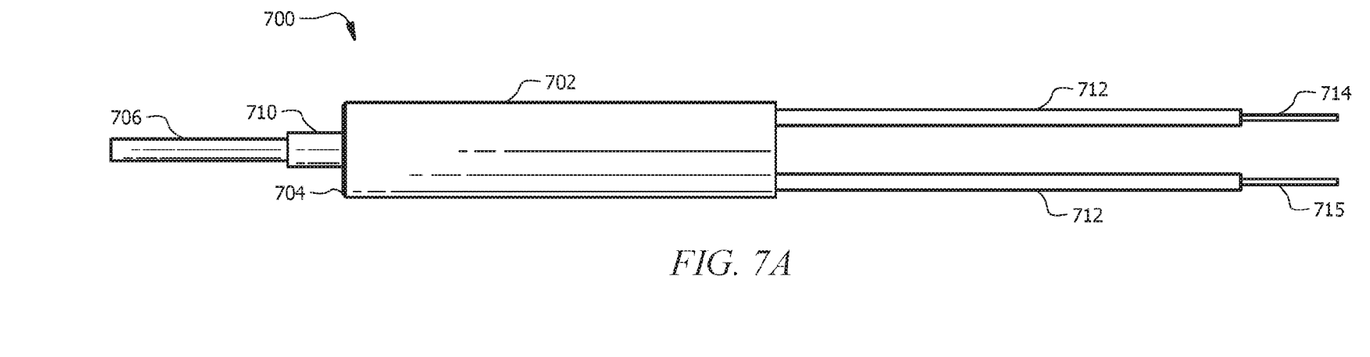
FIGS. 7A-7B illustrate yet another LVDT according to an embodiment of the disclosure.
Figure 7B:
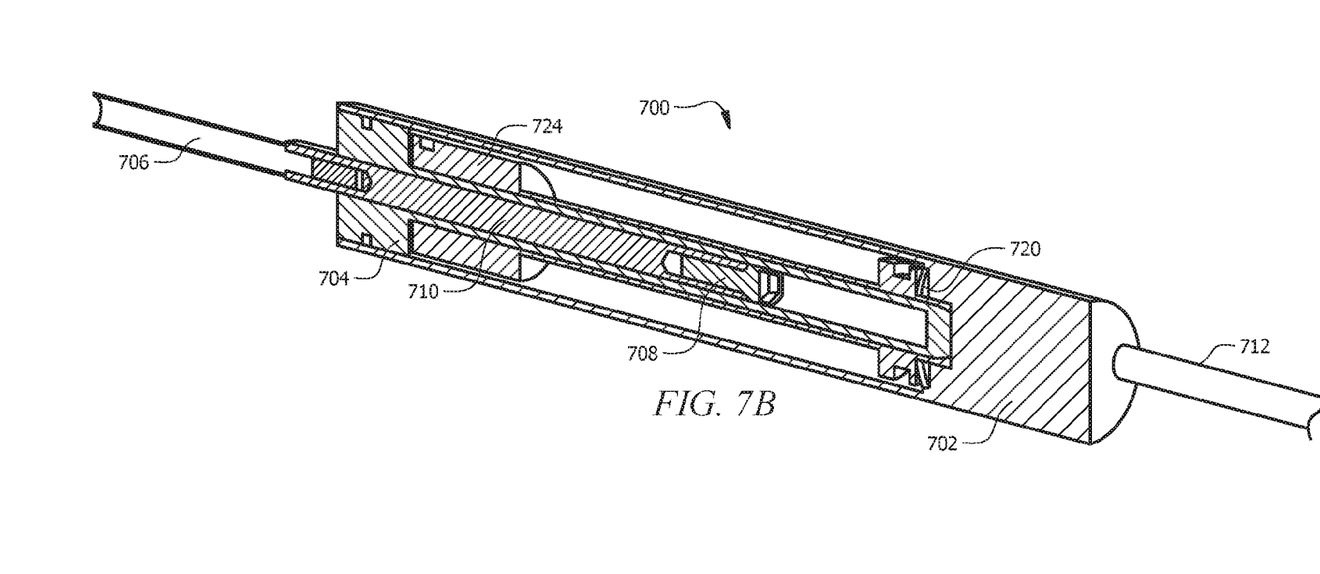

Referring now to FIGS. 7A-7B, another embodiment of an LVDT 700 is shown. FIG. 7A shows a front view of the LVDT 700, while FIG. 7B shows a cross-sectional view of the LVDT 700. In some embodiments, the LVDT 700 may be used in an actuator to accurately measure position and movement. In some embodiments, the LVDT 700 may be similar to the LVDT 100 described in FIGS. 1A, 1B, 2, and 3.

The LVDT 700 may comprise a first bobbin 704 as well as a second bobbin 724. The LVDT 700 may also comprise an enclosure 702 operable to fit over at least a portion of the first bobbin 704 and at least a portion of the second bobbin 724. In some embodiments, the LVDT 700 may comprise a ferromagnetic core 710 operable to fit within the bobbin 704, wherein the core 710 may be operable to move with respect to the bobbin 704. In some embodiments, the core 710 may be attached to one or more probe rods (or extension rods) 706. In some embodiments, the rod(s) 706 may thread into the core 710. Additionally, the core 710 may be attached to one or more screws 708. In some embodiments, the screw(s) 708 may thread into the core 710. The use of rods 706 and screws 708 may depend on the application or use of the LVDT 700. In some embodiments, the rod 706 could extend from either end of the bobbin 704. In some embodiments, two rods 706 may extend from either end of the core 710. The selection and use of rods(s) 706 and/or screw(s) 708 may depend on orientation and/or compensation thermal offsets.

In some embodiments, the LVDT 700 may comprise lead wires 714 and 715 extending from the enclosure 702, wherein the lead wires 714 and 715 may comprise insulation 712. In some embodiments, one end of the enclosure 702 may be sealed or plugged. In some embodiments, the LVDT 700 may comprise other elements (not shown) that may be similar to the LVDT 100 and the LVDT 400, as described above, such as washers, a primary coil, one or more secondary coils, a flexure, and/or a flexible substrate.

In some embodiments, the LVDT 700 may comprise one or more compensation elements operable to provide thermal offset drift compensation. These elements may comprise one or more of: a spring element, a secondary bobbin, and/or a high CTE part incorporated into the LVDT 700. These elements may account for thermal drift and variation difference between the LVDT 700 assembly and the actuator assembly.

In the embodiment shown in FIGS. 7A-7B, the LVDT 700 may comprise a second bobbin 724 operable to fit over the first bobbin 704, which may be operable to provide thermal offset drift compensation. Additionally, the LVDT may comprise a spring washer 720 located between the second bobbin 724 and the enclosure 702, which may be operable to provide thermal offset drift compensation.

In some embodiments, the spring washer 720 may function as a flexible element in the LVDT 700, wherein the spring washer 720 may be operable to provide temperature compensation for the LVDT 700 by absorbing mechanical stresses and/or electro-thermal stresses. The spring washer 720 may also offset variation with vibration and movement of the elements of the LVDT 700. In some embodiments, the spring washer 720 may comprise any flexible material that may be attached to the other elements.

Figure 8:
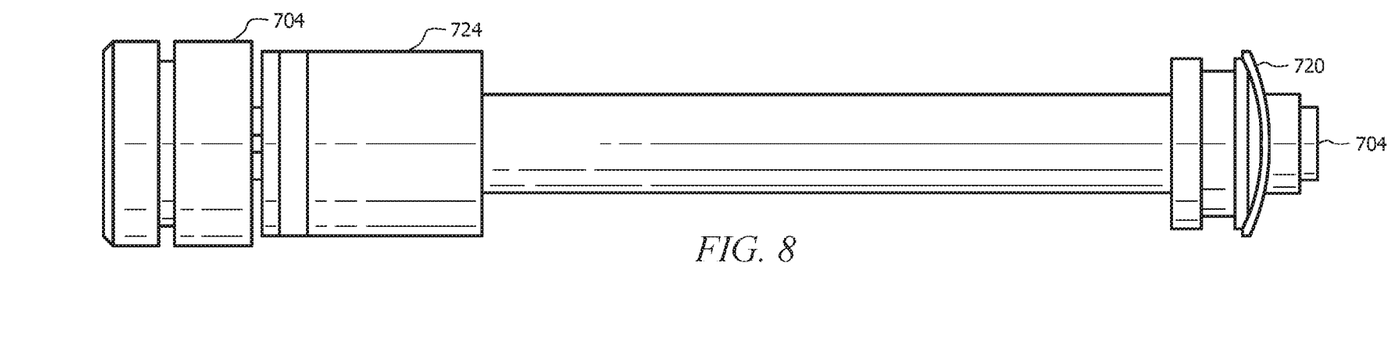
FIG. 8 illustrates a first bobbin and a second bobbin according to an embodiment of the disclosure.

Referring now to FIG. 8, a detailed view of the first bobbin 704, the second bobbin 724, and the spring washer 720 are shown. In some embodiments, the spring washer 720 may be shaped to contact the second bobbin 724 and the enclosure 702 (shown above). In some embodiments, one or more of the bobbins 704 and 724 may comprise additional elements, such as washers, strain relief elements, recesses, cutout, and/or flexures.

Figure 9:
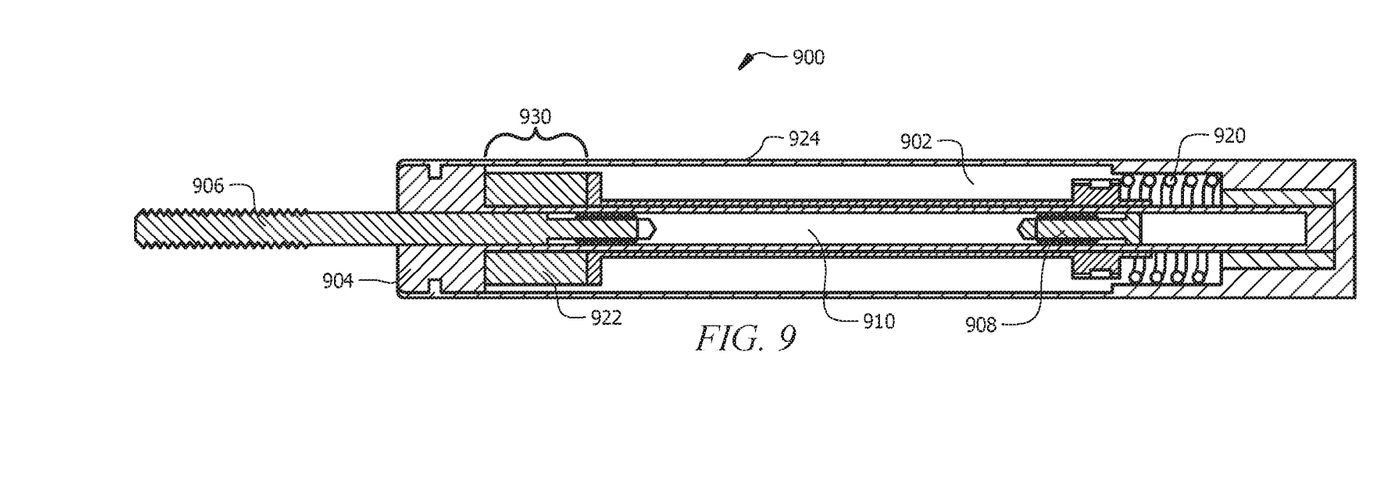
FIG. 9 illustrates yet another LVDT according to an embodiment of the disclosure.

Referring now to FIG. 9, another embodiment of an LVDT 900 is shown. In some embodiments, the LVDT 900 may be used in an actuator to accurately measure position and movement. In some embodiments, the LVDT 900 may be similar to the LVDT 100 described in FIGS. 1A, 1B, 2, and 3.

The LVDT 900 may comprise a first bobbin 904 as well as a second bobbin 924. The LVDT 900 may also comprise an enclosure 902 operable to fit over at least a portion of the first bobbin 904 and at least a portion of the second bobbin 924. In some embodiments, the LVDT 900 may comprise a ferromagnetic core 910 operable to fit within the bobbin 904, wherein the core 910 may be operable to move with respect to the bobbin 904. In some embodiments, the core 910 may be attached to one or more probe rods (or extension rods) 906. In some embodiments, the rod(s) 906 may thread into the core 910. Additionally, the core 910 may be attached to one or more screws 908. In some embodiments, the screw(s) 908 may thread into the core 910. In some embodiments, the LVDT 900 may comprise other elements (not shown) that may be similar to the LVDT 100 and the LVDT 400, as described above, such as washers, a primary coil, one or more secondary coils, a flexure, and/or a flexible substrate.

In some embodiments, the LVDT 900 may comprise one or more elements operable to provide thermal offset drift compensation. These elements may comprise one or more of: a spring element, a secondary bobbin, and/or a high CTE part incorporated into the LVDT 900. These elements may account for thermal drift and variation difference between the LVDT 900 assembly and the actuator assembly.

In the embodiment shown in FIG. 9, the LVDT 900 may comprise a second bobbin 924 operable to fit over the first bobbin 904, which may be operable to provide thermal offset drift compensation. Additionally, the LVDT 900 may comprise a spring 920 located between the second bobbin 924 and the enclosure 902, which may be operable to provide thermal offset drift compensation. Additionally, the LVDT 900 may comprise a compensation part 922 located between the first bobbin 904 and the second bobbin 922. The length 930 of the compensation part 922 may be adjusted to vary offset compensation, based on the application of the LVDT 900. In some embodiments, the compensation part 922 may comprise a high CTE plastic material. In some embodiments, the compensation part 922 may comprise a bi-metal material, an accordion shaped device, or a bladder device.

In a first embodiment, a LVDT may comprise a bobbin; one or more coils formed about the bobbin comprising magnet wire; a ferromagnetic core operable to fit within an opening in the bobbin, and operable to move with respect to the bobbin; an enclosure operable to fit around the bobbin, wherein the enclosure functions as a magnetic return path for the LVDT; one or more lead wires located between the enclosure and at least one coil; and one or more flexible element attached to the bobbin operable to provide temperature compensation for the LVDT by absorbing mechanical stresses.

A second embodiment can include the LVDT of the first embodiment, wherein the flexible element comprises a flexible substrate located between the enclosure and the bobbin.

A third embodiment can include the LVDT of the second embodiment, wherein the flexible substrate comprises a rubber material.

A fourth embodiment can include the LVDT of any of the first to third embodiments, wherein the flexible element comprises a flexure located at one end of the bobbin, wherein a portion of the flexure is operable to bend in response to mechanical stress.

A fifth embodiment can include the LVDT of any of the first to fourth embodiments, further comprising one or more washers integrated into the bobbin.

A sixth embodiment can include the LVDT of any of the first to fifth embodiments, further comprising one or more strain relief elements integrated into the bobbin.

A seventh embodiment can include the LVDT of any of the first to sixth embodiments, wherein the bobbin comprises a thermoplastic material integrated with materials with a coefficient of thermal expansion (CTE) matched to the wire of the coils.

An eighth embodiment can include the LVDT of any of the first to seventh embodiments, further comprising a spring element located between the bobbin and the enclosure, operable to provide thermal offset drift compensation.

A ninth embodiment can include the LVDT of any of the first to eighth embodiments, further comprising a high CTE part located between the bobbin and the enclosure, operable to provide thermal offset drift compensation.

A tenth embodiment can include the LVDT of any of the first to ninth embodiments, further comprising a secondary bobbin located between the bobbin and the enclosure, operable to provide thermal offset drift compensation.

An eleventh embodiment can include the LVDT of any of the first to tenth embodiments, further comprising one or more probe rods attached to the core and extending from the bobbin.

A twelfth embodiment can include the LVDT of any of the first to eleventh embodiments, wherein the enclosure comprises stainless steel.

A thirteenth embodiment can include the LVDT of any of the first to twelfth embodiment, wherein the interior of the enclosure is plated with metal.

In a fourteenth embodiment, a LVDT may comprise a bobbin; one or more coils formed about the bobbin comprising magnet wire; a ferromagnetic core operable to fit within an opening in the bobbin, and operable to move with respect to the bobbin; an enclosure operable to fit around the bobbin; one or more lead wires located between the enclosure and at least one coil; and one or more compensation element operable to provide thermal offset compensation, wherein the compensation element comprises one or more of a spring element, a secondary bobbin, and a high coefficient of thermal expansion (CTE) part.

A fifteenth embodiment can include the LVDT of the fourteenth embodiment, further comprising one or more flexible element attached to the bobbin operable to provide temperature compensation for the LVDT by absorbing mechanical stresses.

A sixteenth embodiment can include the LVDT of the fifteenth embodiment, wherein the flexible element comprises a flexible substrate located between the enclosure and the bobbin.

A seventeenth embodiment can include the LVDT of the fifteenth or sixteenth embodiments, wherein the flexible element comprises a flexure located at one end of the bobbin, wherein a portion of the flexure is operable to bend in response to mechanical stress.

In an eighteenth embodiment, a bobbin for use in a LVDT may comprise a thermoplastic material integrated with materials comprising a coefficient of thermal expansion (CTE) matched to the CTE of wire that form one or more coils about the bobbin; a plurality of washers extending from the bobbin operable to separate the coils; a flexible element operable to provide temperature compensation by absorbing stresses on the bobbin; and one or more strain relief elements extending from the bobbin, wherein a ferromagnetic core may fit through an opening in the bobbin.

A nineteenth embodiment can include the bobbin of the eighteenth embodiment, wherein the flexible element comprises a flexure located at one end of the bobbin, wherein a portion of the flexure is operable to bend in response to mechanical stress.

A twentieth embodiment can include the bobbin of the eighteenth or nineteenth embodiments, further comprising grooves in the opening of the bobbin allowing the core to move quickly back and forth within the opening of the bobbin, while avoiding adiabatic and hydraulic piston effects within the bobbin.

In a twenty-first embodiment a method for operating a LVDT may comprise attaching a ferromagnetic core to one or more rods; assembling the ferromagnetic core within an opening of a bobbin; forming one or more coils about the bobbin; providing an enclosure operable to fit around the bobbin, wherein the enclosure functions as a magnetic return path for the LVDT; moving the ferromagnetic core with respect to the bobbin, in response to movement of the one or more rods; measuring the movement of the ferromagnetic core by measuring the interaction of the ferromagnetic core with the one or more coils; and absorbing mechanical stresses and/or electro-thermal stresses by a flexible element attached to the bobbin.

A twenty-second embodiment can include the method of the twenty-first embodiment, further comprising providing thermal offset compensation by incorporating one or more compensation element, wherein the compensation element comprises one or more of a spring element, a secondary bobbin, and a high coefficient of thermal expansion (CTE) part.

A twenty-third embodiment can include the method of the twenty-first or twenty-second embodiments, further comprising providing temperature compensation via the flexible element.

A twenty-fourth embodiment can include the method of any of the twenty-first to twenty-third embodiments, wherein measuring the movement of the ferromagnetic core comprises measuring a voltage difference between a secondary coil and a primary coil of the one or more coils.

A twenty-fifth embodiment can include the method of any of the twenty-first to twenty-fourth embodiments, wherein forming the one or more coils comprises wrapping wire about the bobbin.

A twenty-sixth embodiment can include the method of the twenty-fifth embodiments, selecting a thermoplastic material for the bobbin, wherein the thermoplastic material is integrated with materials with a coefficient of thermal expansion (CTE) matched to the wire of the coils.

A twenty-seventh embodiment can include the method of any of the twenty-first to twenty-sixth embodiments, further comprising creating grooves in the opening of the bobbin, thereby allowing the core to move quickly back and forth within the opening of the bobbin, while avoiding adiabatic and hydraulic piston effects within the bobbin.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A linear variable differential transformer (LVDT) comprising:
    a bobbin;
    one or more coils formed about the bobbin comprising magnet wire, wherein the bobbin comprises a thermoplastic material integrated with materials with a coefficient of thermal expansion (CTE) matched to that of the wire of the coils;
    a ferromagnetic core to fit within an opening in the bobbin, and to move with respect to the bobbin;
    an enclosure to fit around the bobbin, wherein the enclosure functions as a magnetic return path for the LVDT;
    one or more lead wires located between the enclosure and the at least one coil; and
    a flexible element attached to the bobbin to provide temperature compensation for the LVDT by absorbing mechanical stresses.

2. The LVDT of claim 1, wherein the flexible element comprises a flexible substrate located between the enclosure and the bobbin.

3. The LVDT of claim 2, wherein the flexible substrate comprises a rubber material.

4. The LVDT of claim 1, wherein the flexible element comprises a flexure located at one end of the bobbin, wherein a portion of the flexure is to bend in response to mechanical stress.

5. The LVDT of claim 1, further comprising one or more washers integrated into the bobbin.

6. The LVDT of claim 1, further comprising one or more strain relief elements integrated into the bobbin.

7. The LVDT of claim 1, further comprising a spring element located between the bobbin and the enclosure, to provide thermal offset drift compensation.

8. The LVDT of claim 1, further comprising a high CTE part located between the bobbin and the enclosure, to provide thermal offset drift compensation.

9. The LVDT of claim 1, further comprising one or more probe rods attached to the core and extending from the bobbin.

10. The LVDT of claim 1,
    wherein the LVDT further comprises:
    a plurality of washers extending from the bobbin to separate the coils; and
    one or more strain relief elements extending from the bobbin.

11. The LVDT of claim 10, wherein the flexible element comprises a flexure located at one end of the bobbin, wherein a portion of the flexure is to bend in response to mechanical stress.

12. A method for operating a linear variable differential transformer (LVDT), the method comprising:
    attaching a ferromagnetic core to one or more rods;
    assembling the ferromagnetic core within an opening of a bobbin;
    forming one or more coils about the bobbin, comprising wrapping wire about the bobbin;
    selecting a thermoplastic material for the bobbin, wherein the thermoplastic material is integrated with materials with a coefficient of thermal expansion (CTE) matched to that of the wire of the coils;
    providing an enclosure to fit around the bobbin, wherein the enclosure functions as a magnetic return path for the LVDT;
    moving the ferromagnetic core with respect to the bobbin, in response to movement of the one or more rods;
    measuring the movement of the ferromagnetic core by measuring the interaction of the ferromagnetic core with the one or more coils; and
    absorbing mechanical stresses and/or electro-thermal stresses by a flexible element attached to the bobbin.

13. The method of claim 12, further comprising providing thermal offset compensation by incorporating one or more compensation element, wherein the compensation element comprises one or more of a spring element and a high coefficient of thermal expansion (CTE) part.

14. The method of claim 12, further comprising providing temperature compensation via the flexible element.

15. The method of claim 12, wherein measuring the movement of the ferromagnetic core comprises measuring a voltage difference between a secondary coil and a primary coil of the one or more coils.

* * * * *